Figure 1:
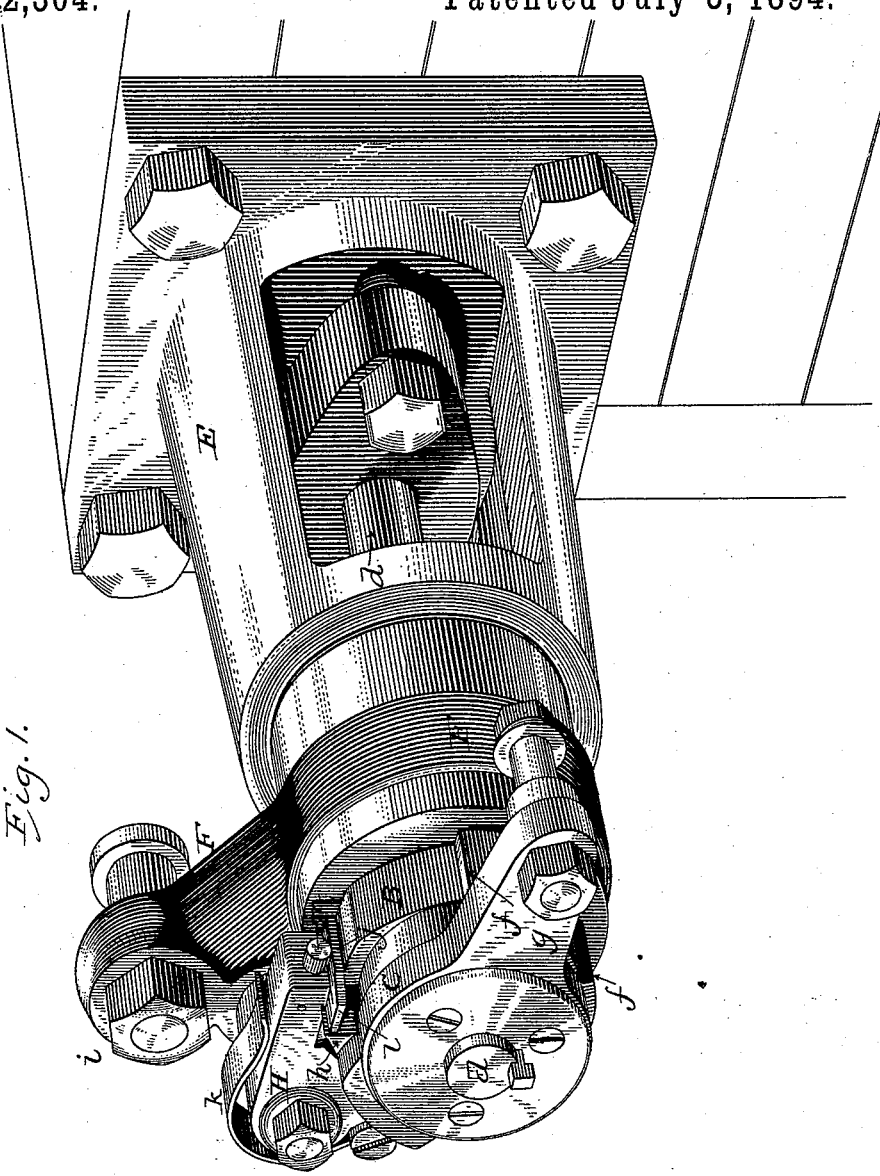

(No Model.) 3 Sheets—Sheet 1.

E. REYNOLDS.
VALVE MECHANISM.

No. 522,304. Patented July 3, 1894.

Witnesses
C. C. Burdick.
C. B. Bull.

Edwin Reynolds
Inventor
by Dodge & Sons
Attorneys.

THE NORRIS PETERS CO., PHOTO-LITHO., WASHINGTON, D. C.

(No Model.) 3 Sheets—Sheet 2.
E. REYNOLDS.
VALVE MECHANISM.
No. 522,304. Patented July 3, 1894.
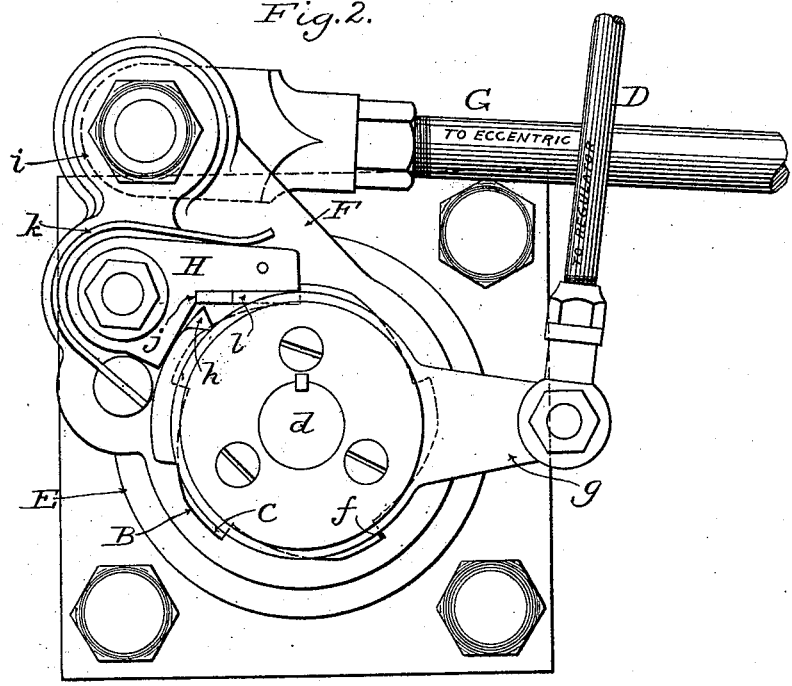
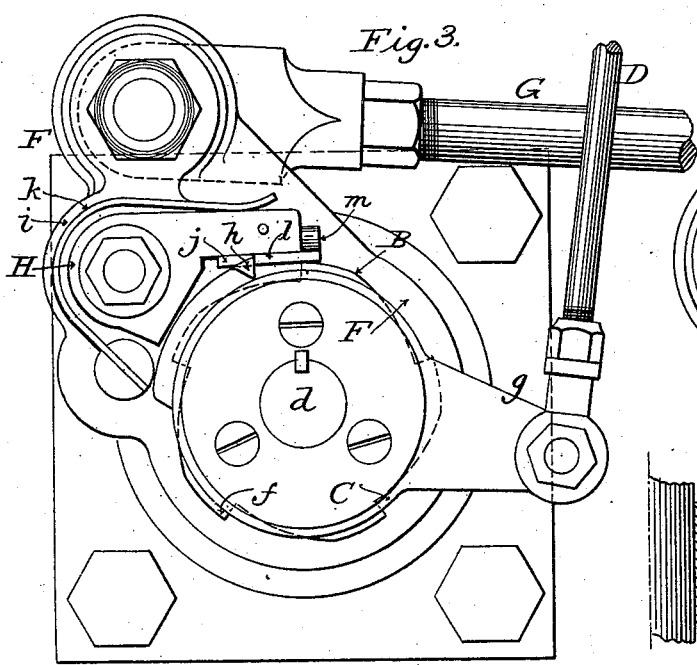
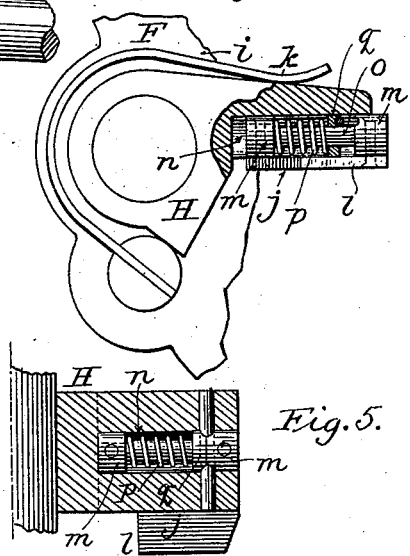
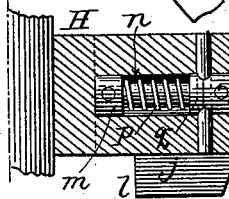
Witnesses
Inventor
Edwin Reynolds
by Dodge & Sons
Attorneys

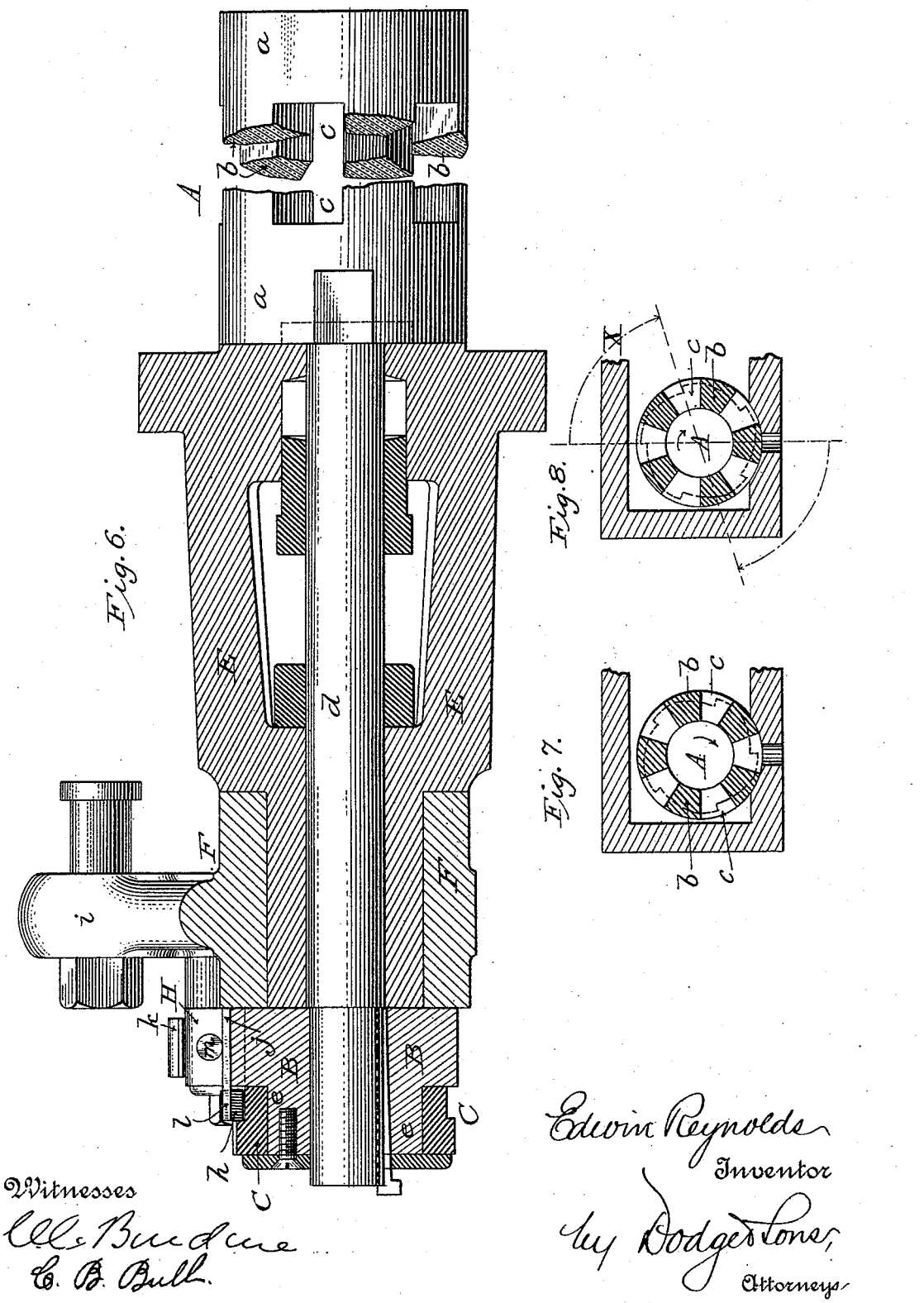

UNITED STATES PATENT OFFICE.

EDWIN REYNOLDS, OF MILWAUKEE, WISCONSIN.

VALVE MECHANISM.

SPECIFICATION forming part of Letters Patent No. 522,304, dated July 3, 1894.

Application filed January 27, 1894. Serial No. 498,230. (No model.)

*To all whom it may concern:*

Be it known that I, EDWIN REYNOLDS, a citizen of the United States, residing at Milwaukee, in the county of Milwaukee and State of Wisconsin, have invented certain new and useful Improvements in Valve Mechanism, of which the following is a specification.

My invention relates to valve gear for engines, and consists, first, in a novel construction of the valve; and second, in a novel construction of the mechanism for operating the valve.

In the drawings,—Figure 1 is a perspective view of the bonnet and attached parts with the valve-operating devices thrown out of action; Figs. 2 and 3 front end views of the same, in different positions; Figs. 4 and 5 views illustrating the construction of the pawl and the plate carried thereby; Fig. 6 a longitudinal sectional view through the bonnet and attached parts, with the valve in side elevation; and Figs. 7 and 8 cross-sectional views of the valve, on a reduced scale, in different positions.

The valve A, as shown in Figs. 6, 7, and 8, has the cylindrical heads $a\ a$, connected by equally-spaced bars $b\ b$ arranged parallel to each other and parallel with the axis, to form parts or passages $c$,—the outer faces of the bars being rounded or curved on the arc of a circle so as to form, in connection with the heads, a cylindrical valve capable of an intermittent (step by step) rotation in one and the same direction.

Keyed or otherwise rigidly secured to the valve stem $d$ is a ratchet wheel B which has a hub or reduced neck $e$ and a series of teeth $f$, as clearly shown in Fig. 6,—the number of teeth corresponding to the number of bars $b$ of the valve, so that when the valve is turned, it will move a distance represented by the dotted lines in Fig. 8.

Mounted upon the hub or neck of the ratchet wheel is a collar C which has a radial arm $g$ and also a peripheral lug or projection $h$ shown in Figs. 1, 2, 3, and 6,—the radial arm being connected by a rod D with a flyball or other governor or regulator (not shown) so that the collar may be oscillated by such governor or regulator independently of any movement of the ratchet wheel.

Mounted upon the bonnet E is a sleeve F having a radial arm $i$ which is connected to the eccentric-rod G as shown in Figs. 2 and 3, while upon the front face of the arm is pivoted a pawl H which is adapted, under normal working conditions, to engage the teeth of the ratchet wheel,—a spring $k$ bearing upon the pawl tending to keep the latter down into position to engage the ratchet teeth.

Fitted to the under side of the pawl is a flat plate $j$ which has a laterally-projecting portion or shoulder $l$, which, under abnormal working conditions, is struck by the lug or projection $h$ of the collar C. This plate $j$, see Figs. 4 and 5, has secured to its upper face two blocks $m$ which fit into a socket $n$ in the pawl and thereby guide the plate in its movements. The short stem or rod $o$ connecting these blocks, is encircled by a light spring $p$ which bears at one end against one of said blocks and at the other end against a plug or disk $q$ fastened within said socket and perforated to receive the stem or rod. Spring $p$ keeps the plate normally retracted, with its front edge in line with the vertical nose of the pawl, as shown in Figs. 2 and 5, but is capable of being compressed so as to permit the plate to project beyond the nose or end of the pawl, as in Figs. 1, 3, and 6.

The operation is as follows: If, under normal working conditions, the sleeve F be rocked by the eccentric rod G, the pawl H engaging the ratchet wheel B,—see Fig. 2,— will turn or rotate said wheel and the valve through an arc X (Fig. 8) of seventy-two degrees. The movement of the valve through this arc, first takes the bar off the casing or seat-port, then brings the valve-port over the latter, and finally the next bar over the seat-port, thus insuring a positive opening and closing of the ports at each step by step movement. The valve having been opened and closed by this forward movement of the sleeve F, will be left in its closed position while the sleeve is oscillated or turned backward preparatory to engaging the next tooth of wheel B which it will do unless prevented by the regulating collar C. If there be a variation in the work of the engine, such as an undue increase in speed, the governor or regulator will, acting through its rod D, rock or slightly oscillate the collar C and bring its lug or projection $h$ into the path of the plate $j$ (carried by the pawl), so that when the pawl is moving backward to engage the next ratchet tooth as above described, this lug $h$ will arrest the movement of the plate $j$ while allowing the pawl to continue its backward movement. As shown in Fig. 3 this engagement is effected just before the pawl rides off the crown of the tooth. This results in a virtual elongation of the pawl for the time being, and prevents it from dropping down to engage the ratchet tooth. Of course, when the sleeve F again moves forward, it will not impart motion to the ratchet wheel and valve, and no steam will be admitted,—the engine continuing to run without the admission of more steam to the cylinder. The parts will remain in this relative position until the normal working conditions are resumed, whereupon the regulating collar will be brought to the position shown in Fig. 2,—out of the path of the plate $j$. The sleeve F has an oscillating movement which being transmitted to the valve through the pawl and ratchet imparts to said valve, an intermittent or step by step rotation in one direction only, at each forward oscillation of the sleeve, unless the regulator has brought its lug $h$ into such position as to engage the sliding plate $j$ and thereby prevent the pawl from dropping down to engage the ratchet wheel. It will also be noticed that the valve is moved from the closed to the open position and finally to the closed position, by one continuous motion, represented by the arc X of Fig. 8; and, furthermore, that each bar of the valve, in turn, controls the admission of steam to the cylinder during a partial rotation of the valve.

What I claim is—

1. In combination with a valve having a number of equally-spaced parallel bars $b$ and ports $c$; a ratchet wheel, B provided with a similar number of teeth and secured to the valve; and an oscillating member journaled concentric with the valve and provided with a pawl to engage the ratchet wheel.

2. In combination with a valve substantially such as shown and described, a pawl and ratchet mechanism for imparting a step by step motion in one direction to said valve; a sliding plate $j$ carried by the pawl; and a regulator collar C to engage the plate and prevent the pawl from engaging the ratchet.

3. In combination with a valve, a pawl-and-ratchet mechanism which under normal working conditions imparts to said valve, an intermittent rotation in one direction; and means controlled by the regulator or governor for throwing said pawl out of action.

4. In combination with valve A and ratchet wheel B; the sleeve F provided with pawl H; a sliding toe or plate $j$ carried by the pawl; and a regulating collar C provided with a lug $h$ to engage the toe or plate.

5. In combination with valve A and ratchet wheel B; the sleeve F provided with pawl H; a sliding toe or plate $j$ carried by the pawl; a spring to hold the toe within the pawl; and a regulating collar C provided with a lug $h$ to engage the toe or plate.

In witness whereof I hereunto set my hand in the presence of two witnesses.

EDWIN REYNOLDS.

Witnesses:
 A. Z. ROYER,
 B. T. LEUZARDER.